United States Patent
Koike-Akino et al.

(10) Patent No.: US 8,433,205 B2
(45) Date of Patent: Apr. 30, 2013

(54) CROSSTALK-FREE HIGH-DIMENSIONAL CONSTELLATIONS FOR DUAL-POLARIZED NONLINEAR FIBER-OPTIC COMMUNICATIONS

(75) Inventors: Toshiaki Koike-Akino, Cambridge, MA (US); Philip V. Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 224 days.

(21) Appl. No.: 13/086,020

(22) Filed: Apr. 13, 2011

(65) Prior Publication Data

US 2012/0263454 A1 Oct. 18, 2012

(51) Int. Cl.
*H04B 10/04* (2006.01)
*H04B 10/08* (2006.01)
*H04B 10/00* (2006.01)
*H04B 10/12* (2006.01)
*H04J 14/00* (2006.01)

(52) U.S. Cl.
USPC ............ 398/194; 398/25; 398/152; 398/79; 398/148

(58) Field of Classification Search .......... 398/194, 398/25, 152, 79, 148
See application file for complete search history.

(56) References Cited

U.S. PATENT DOCUMENTS

| 2003/0090768 | A1* | 5/2003 | Liu et al. ................ 359/183 |
| 2007/0092260 | A1* | 4/2007 | Bontu et al. .............. 398/152 |
| 2010/0189445 | A1* | 7/2010 | Nakashima et al. ...... 398/152 |

OTHER PUBLICATIONS

Magnus Karlsson and Henrik Sunnerud, "Effects of Nonlinearities on PMD-Induced System Impairments", Journal of Lightwave Technology, vol. 24, No. 11, Nov. 2006.*
Youssef Said, Houria Rezig, Ammar Bouallegue, "Cross-Polarization Modulation Effects in Long Semiconductor Optical Amplifiers", Sys'com Lab, National Engineering School of Tunis, Tunisia.*
Marcus Winter, Student Member, IEEE, Dario Setti, and Klaus Petermann, Fellow, IEEE, "Cross-Polarization Modulation in Polarization-Division Multiplex Transmission",IEEE Photonics Technology Letters, vol. 22, No. 8, Apr. 15, 2010.*
Marcus Winter, Student Member, IEEE, Christian-Alexander Bunge, Member, IEEE, Daria Setti, and Klaus Petermann, Fellow, IEEE, "A Statistical Treatment of Cross-Polarization Modulation in DWDM Systems" Journal of Lightwave Technology, vol. 27, No. 17, Sep. 1, 2009.*
Magnus Karlsson et al.; "Effects of Nonlinearities on PMD-Induced System Impairments," Journal of Lightwave Technology, vol. 24, No. 11, Nov. 2006 pp. 4127-4137.

(Continued)

*Primary Examiner* — Kenneth N Vanderpuye
*Assistant Examiner* — Abbas H Alagheband
(74) *Attorney, Agent, or Firm* — Gene Vinokur; Dirk Brinkman

(57) ABSTRACT

A method reduces time-varying polarization crosstalk due to XPolM by transmitting multi-dimensional orthogonal constellations. Three variants of crosstalk-free constellations are provided: Grassmann constellations, unitary constellations, and rotation codes. The method uses the Grassmann constellations and the unitary constellations to deal with fiber nonlinearity by applying as a polarization-time coding. The rotation codes exploit a fiber channel characteristic to improve performance and to reduce computational complexity. The underlying orthogonality behind those constellations enables the receiver to decode it as if there is no polarization crosstalk. Moreover, the required computational complexity at the receiver is significantly reduced because neither crosstalk cancellers nor channel estimators are needed.

9 Claims, 4 Drawing Sheets

OTHER PUBLICATIONS

Marcus Winter et al.; "Cross-Polarization Modulation in Polarization-Division Multiplex Transmission;" IEEE Photonics Technology Letters, vol. 22, No. 8, Apr. 15, 2010 pp. 538-540.

Marcus Winter et al.; "A Statistical Treatment of Cross-Polarization Modulation in DWDM Systems;" Journal of Lightwave Technology, vol. 27, No. 17, Sep. 1, 2009 pp. 3739-3751.

* cited by examiner

100

200

300

400

CROSSTALK-FREE HIGH-DIMENSIONAL CONSTELLATIONS FOR DUAL-POLARIZED NONLINEAR FIBER-OPTIC COMMUNICATIONS

FIELD OF THE INVENTION

This invention relates generally to optical communication systems, and more particularly to avoiding depolarization effects due to fiber nonlinearity, specifically cross-polarization modulation.

BACKGROUND OF THE INVENTION

In optical communication systems that use polarization multiplexing (POLMUX), two optical signals are polarized orthogonally with respect to each other before being transmitted in an optical channel at a certain wavelength. This doubles the data rate of the channel. To realize a high-speed transmission over 100 Gbps, both POLMUX and dense-wavelength-division multiplexing (DWDM) are needed.

However, the constantly alternating bit sequences of the POLMUX signal in DWDM systems cause the resulting polarization to change over time. This depolarization effect results in cross-polarization modulation (XPolM), which is essentially noise. The XPolM impairment is induced by inter-channel fiber nonlinearity particularly for DWDM optical communication systems. Due to the XPolM, the dual-polarized (DP) signals, which originally were polarized orthogonally, are no longer so, and cannot be separated at a receiver by a polarization splitter.

XPolM causes significant performance degradation in bit error rate or in quality factor for DP coherent optical systems. The induced polarization crosstalk has a low-pass response because of chromatic dispersion, resulting in a short coherence time of tens of symbols. Such a fast time-varying polarization crosstalk is hard to be compensated at receivers for current optical communication systems.

Most conventional techniques focus on compensating the time-varying XPolM effect at the receiver, through the use of a crosstalk cancellation with adaptive channel estimation. However, the performance improvement is limited by the channel estimation accuracy, which is severely degraded by rapid time-varying channels, particularly due to the XPolM. In addition, nonlinear compensation methods at the receiver have a high-computational complexity to implement in circuits.

Some nonlinear rotations such as self-phase modulation (SPM) are well treated by differential coding schemes like dual-polarized differential quadrature phase-shift keying (DP-DQPSK) even without accurate channel estimations. However, DP-DQPSK suffers from severe performance degradations in the presence of polarization crosstalk due to XPolM and polarization mode dispersion (PMD).

SUMMARY OF THE INVENTION

The embodiments of the invention provide a method for tolerating nonlinear effects of XPolM, cross-phase modulation (XPM), self-phase modulation (SPM), and linear effects of PMD in coherent fiber-optic communication networks, wherein multiple wavelengths with POLMUX signals are densely multiplexed as DWDM systems.

The method uses dimension-extended constellations, which automatically resolve any polarization crosstalk at a transmitter. Such a self-polarization-isolation property comes from a specific constellation design, which mutually orthogonalizes x-polarization and y-polarization signals. The joint design of x-/y-polarization signals reduces a significant amount of computational complexity at the receiver side because neither crosstalk cancellers nor channel estimations are required.

The embodiments of the invention provide three variants of crosstalk-free constellation designs, more specifically, Grassmann constellations, unitary constellations, and rotation codes.

The Grassmann constellations and the unitary constellations have been used as space-time coding for wireless communications. The invention adapts those constellations as polarization-time coding for optical communications to deal with XPolM, XPM, SPM and PMD. The rotation codes leverage a unique property of optical channels, i.e., near-unitary characteristics, to improve performance and to reduce computational complexity.

At the receiver, the crosstalk-free multi-dimensional constellations are decoded by generalized-likelihood ratio test (GLRT) process without estimating crosstalk channels. The GLRT decoding is further improved by multi-symbol decoding, unitary constraint, and a high-order approach to deal with rapid time-varying channels. The joint use of trellis-coded modulation (TCM), and the crosstalk-free multi-dimensional constellations offers further gains.

DETAILED DESCRIPTION OF THE PREFERRED EMBODIMENT

Figure 1:
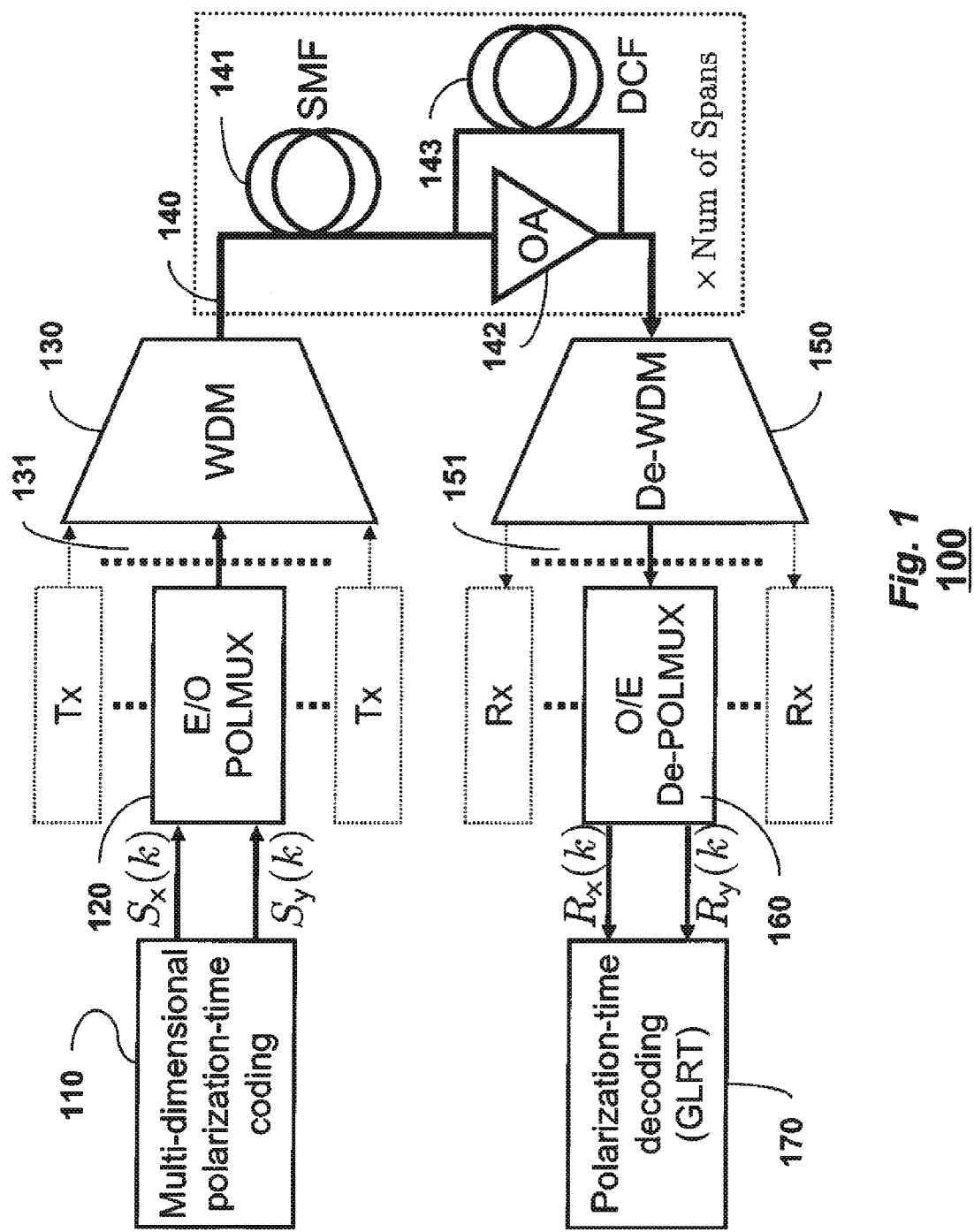
FIG. 1 is a schematic of a coherent fiber-optic communications with DWDM and POLMUX, according to embodiments of the invention.

FIG. 1 shows the preferred embodiments of coherent fiber-optic communication systems 100 which use POLMUX and WDM. At a channel of interest, x-polarization signal $S_x(k)$ and y-polarization signal $S_y(k)$, at the k-th symbol instance, are generated by electrical modulators 110 for multi-dimensional constellations. After passing through an electrical filter, x/y-polarization signals $S_x(k)$ and $S_y(k)$ are up-converted to optical signal by an electrical-to-optical (E/O) modulator with POLMUX 120, which orthogonally polarizes the signals $S_x(k)$ and $S_y(k)$.

The up-converted optical signal is then multiplexed with a number of different wavelengths 131, using a transmitter circuit (Tx), by a WDM multiplexer, such as an arrayed waveguide grating device 130. The WDM optical signals propagate through an optical fiber channel 140, which consists of multiple-span sets of single-mode fibers (SMF) 141, optical amplifiers (OA) such as erbium doped fiber amplifier 142 and 144, and dispersion compensation fibers (DCF) 143.

At a receiver, WDM signals are first de-multiplexed by a de-WDM device 150 to separate different wavelengths to the corresponding receiver (Rx) circuits 151. For the channel of interest, the optical signal is down-converted by optical-to-electrical (O/E) converter with de-POLMUX 160, which obtains x-polarization received signal $R_x(k)$ and y-polarization received signal $R_y(k)$ at the k-th symbol instance. To decode the multi-dimensional orthogonal constellations transmitted from the modulator 110, a blind process with generalized-likelihood ratio test (GLRT) decoding 170 is used at the receiver.

For the dispersion-managed fibers, the received signals $R_x(k)$ and $R_y(k)$ are well modeled by a linear crosstalk representation as follows:

$$\begin{bmatrix} R_x(k) \\ R_y(k) \end{bmatrix} = Ae^{jB} \begin{bmatrix} e^{jC}\sqrt{1-|W(k)|^2} & -W*(k) \\ W(k) & e^{-jC}\sqrt{1-|W(k)|^2} \end{bmatrix} \begin{bmatrix} S_x(k) \\ S_y(k) \end{bmatrix} + \begin{bmatrix} N_x(k) \\ N_y(k) \end{bmatrix}$$

$$\Rightarrow R(k) = H(k)S(k) + N(k),$$

where A corresponds to a received signal magnitude, B is a common phase rotation caused by self-phase modulation (SPM) and cross-phase modulation (XPM), C corresponds to the phase difference between x-polarization and y-polarization, W(k) denotes the crosstalk factor from x-polarization to y-polarization, and $[N_x(k), N_y(k)]$ is additive noise for dual polarizations at the k-th symbol.

Here, denotes an imaginary unit and the superscript $[.]^*$ is the complex conjugate. Accordingly, the received signal vector $R(k)=[R_x(k), R_y(k)]$ is given by a channel matrix M(k) and the transmitted signal vector $S(k)=[S_x(k), S_y(k)]$ plus the noise vector $N(k)=[N_x(k), N_y(k)]$. The crosstalk W(k) is caused by cross-polarization modulation (XPolM) and polarization-mode dispersion (PMD). The covariance of the crosstalk W(k) has a short coherence time in particular due to XPolM, which is caused by WDM interfering channels and POLMUX signals. Because of the crosstalk between x-polarization signal and y-polarization signal, the DP received signals are no longer orthogonal to each other.

Figure 2:
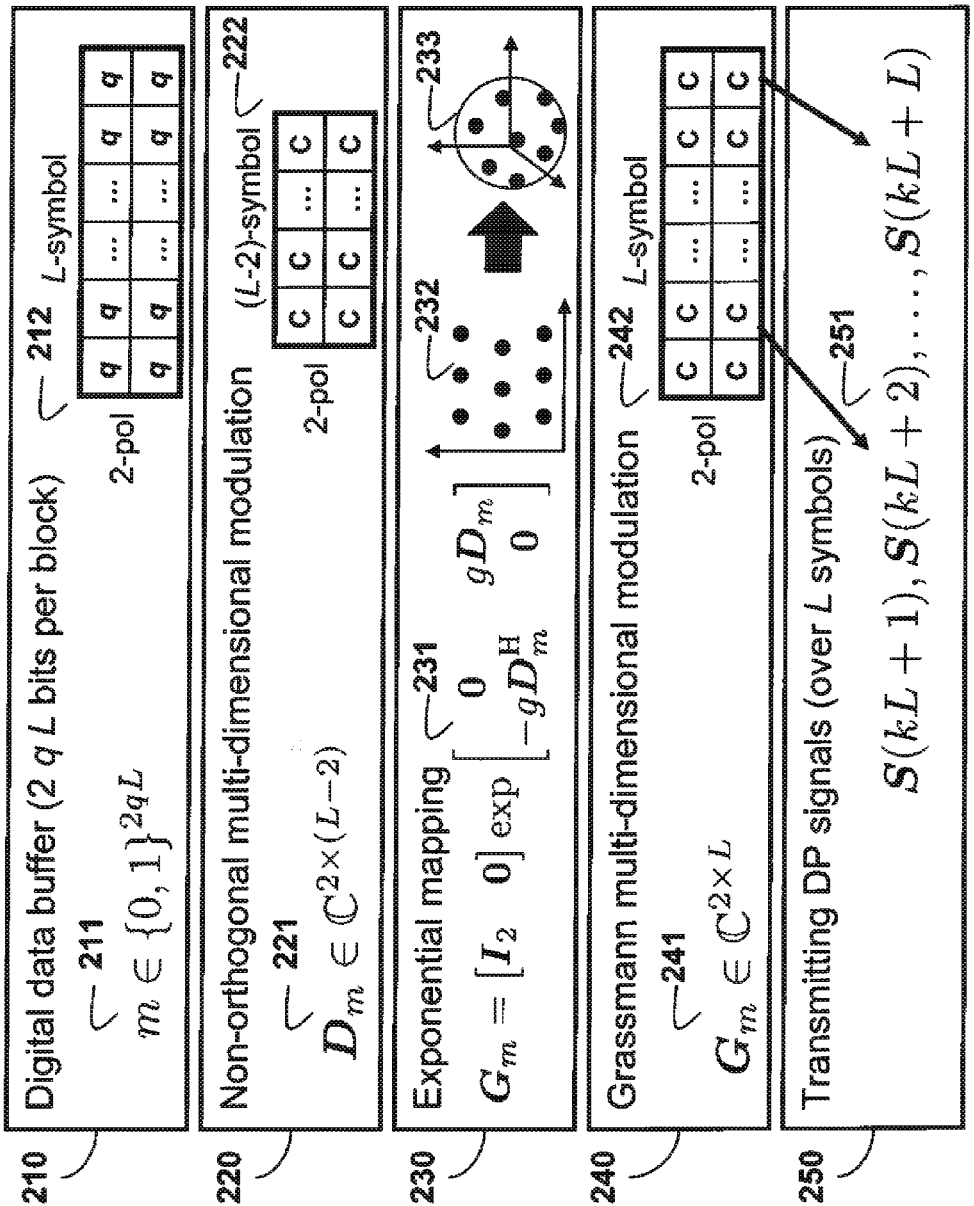
FIG. 2 is a schematic of a multi-dimensional orthogonal constellation based on Grassmann polarization-time codes, according to embodiments of the invention.
Figure 3:
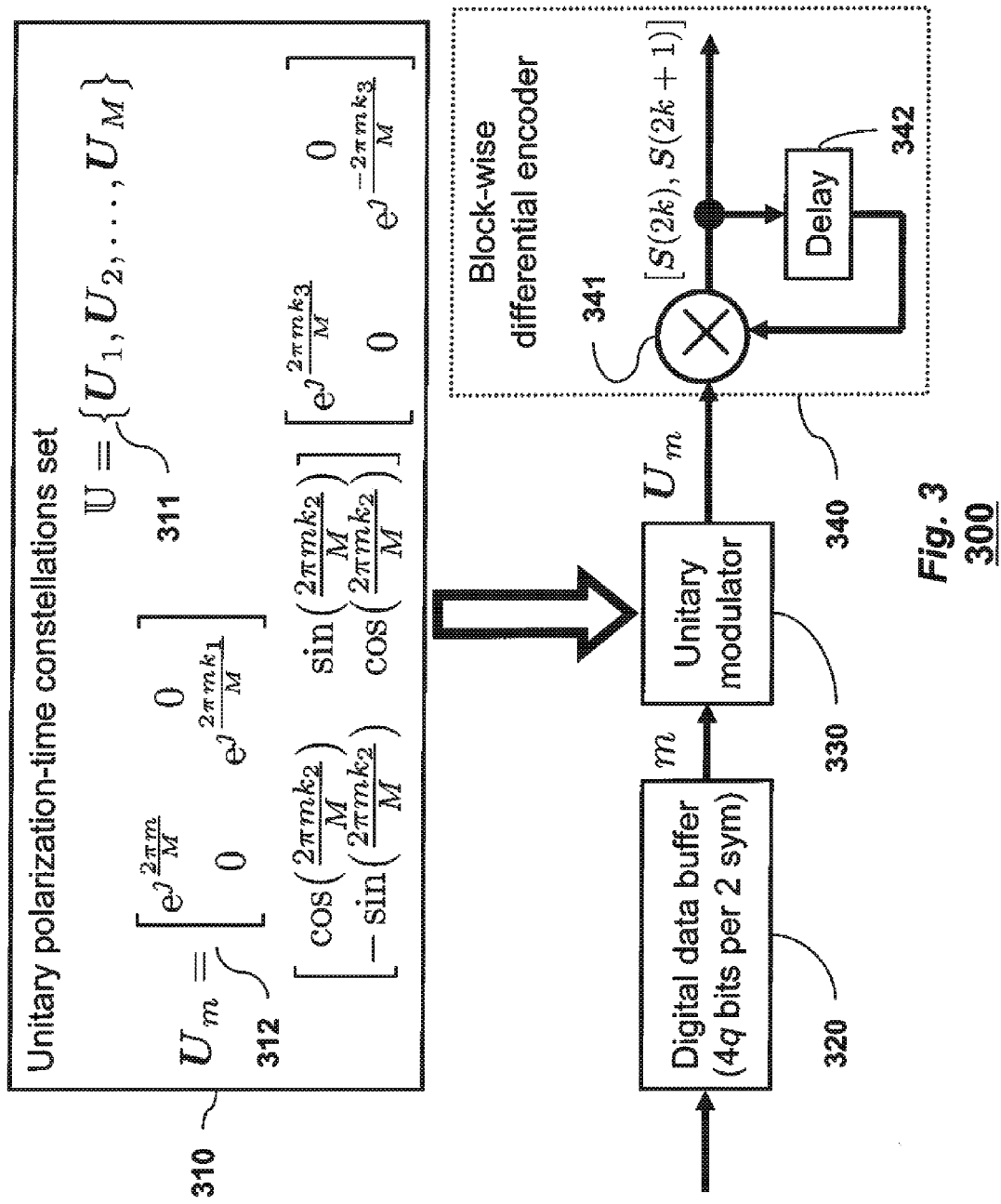
FIG. 3 is a block diagram of a differential unitary constellation based on polarization-time coding, according to embodiments of the invention.
Figure 4:
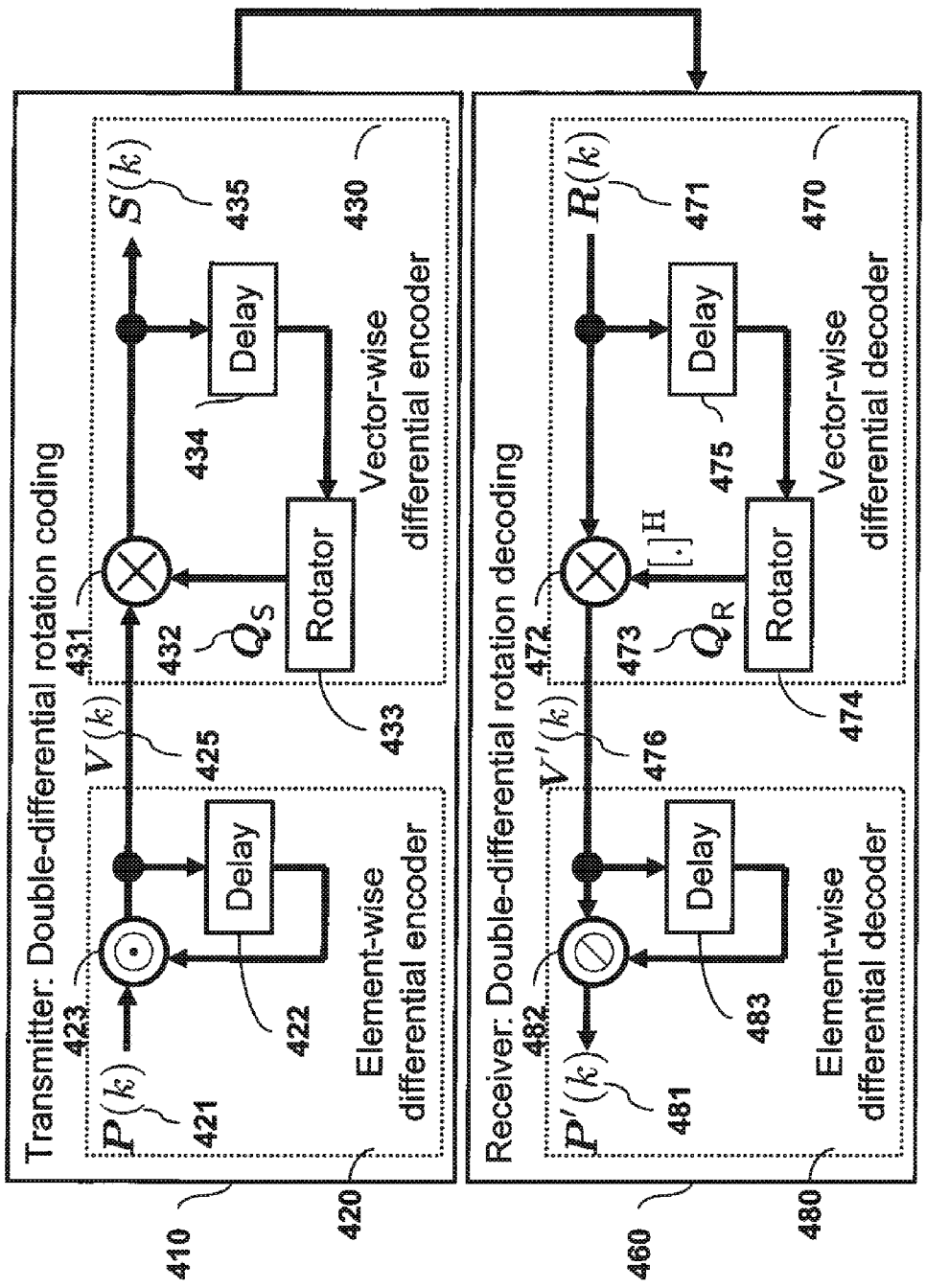
FIG. 4 is a schematic of a multi-dimensional orthogonal constellation based on double-differential rotation codes, according to embodiments of the invention.

One component of the invention is the multi-dimensional orthogonal modulator 110, which is either based on Grassmann constellations 200, unitary constellations 300 or rotation codes 400, see FIGS. 2-4.

The underlying orthogonality between x-polarization signal and y-polarization signal of the constellations automatically resolves any crosstalk even without estimating the channels and canceling the crosstalk. Therefore, the method significantly reduces the computational complexity of a digital signal processing to compensate polarization crosstalk at the receiver.

FIG. 2 shows a signal constellation design over a Grassmannian manifold, which maps any arbitrary multi-dimensional modulation into a hyper-sphere surface by exponential projections. The signal modulation includes five steps: digital data buffering 210, non-orthogonal multi-dimensional modulating 220, exponential mapping 230, Grassmann orthogonal multi-dimensional modulating 240, and DP signal transmitting 250.

Let q be the number of bits to be transmitted per symbol per polarization, e.g., q=2. The Grassmann constellations are of a dimension 2×L, where 2 corresponds to dual polarization and L is the block length in time, e.g., L=4. Thus, the total number of bits per block becomes 2qL, and the cardinality of the Grassmann constellations is $2^{2qL}$. A buffer 210 of 2qL bits for x-/y-polarization over L symbols 212 produces a constellation index m ($m<2^{2qL}$) 211.

For the index m, a non-orthogonal multi-dimensional constellation $D_m$ 221 is generated e.g. by a lattice modulation or simply by individual quadrature amplitude modulations (QAM). The dimension of the constellation $D_m$ 222 is set to be 2×(L−2), which is smaller than the desired dimension of 2×L. The constellation $D_m$ is then mapped into a Grassmannian manifold by exponential projection 231 as follows:

$$G_m = [\, I_2 \;\; 0 \,] \exp \begin{bmatrix} 0 & gD_m \\ -gD_m^H & 0 \end{bmatrix},$$

where $I_2$ is a (2×2)-dimensional identity matrix, g is a constant value which controls the codeword distance, and $[.]^H$ denotes the Hermitian transpose. The exponential mapping projects a Cartesian coordinated constellation point 232 to a surface point of a higher-dimensional hyper sphere 233. The projected Grassmann constellation $G_m$ 241 is of a desired dimension of (2×L) 242, and every codeword has an orthogonal property, more specifically, $G_m G_m^H = I_2$. It implies that the x-polarization signal is perpendicular to the y-polarization signal and vice versa. The m-th constellation $G_m$ is sequentially transmitted for x-/y-polarization signals over L symbols, [S(kL+1), S(kL+2), . . . , S(kL+L)] 251 for the k-th block. Note that the m-th codeword constellations are pre-determined given a fixed value for g and original modulations $D_m$.

To decode the Grassmann constellations, the GLRT process provides the maximum-likelihood (ML) performance because of the codeword orthogonality by searching for the maximum squared norm over the sub-space codeword projection of the L-symbol received signal block as follows:

$$\max_m \| [\, R(kL+1) \;\; \ldots \;\; R(kL+L) \,] G_m^H \|^2,$$

where $\|.\|$ denotes the Euclidean norm. Because x-/y-polarization signals are mutually orthogonal, the GLRT process obtains the ML estimate of the transmitted data regardless of any polarization crosstalk. Hence, crosstalk cancellations and channel estimations are not necessary at the receiver for any depolarized fiber channels. The performance is improved with multi-block decoding with high-order GLRT.

Although the Grassmann constellation achieves near-capacity performance when the block length goes to infinity, it becomes hard to optimize all the constellation points for a large cardinality. The minimum allowable block length for Grassmann constellations is L=4, for which the cardinality becomes more than 65 thousand to achieve 2 bits per second per polarization.

As shown in FIG. 3, as an alternative approach which reduces the cardinality, the embodiments of invention provide a method 300 to make a full use of unitary constellations which allow differential encoding for (2×2)-dimensional modulations. As an example of unitary constellations, the m-th codeword $U_m$ 312 of the unitary code set U 311 is given by the following form:

$$U_m = \begin{bmatrix} e^{j\frac{2\pi m}{M}} & 0 \\ 0 & e^{j\frac{2\pi m k_1}{M}} \end{bmatrix} \begin{bmatrix} \cos\left(\frac{2\pi m k_2}{M}\right) & \sin\left(\frac{2\pi m k_2}{M}\right) \\ -\sin\left(\frac{2\pi m k_2}{M}\right) & \cos\left(\frac{2\pi m k_2}{M}\right) \end{bmatrix}$$

-continued $$\begin{bmatrix} e^{j\frac{2\pi mk_3}{M}} & 0 \\ 0 & e^{j\frac{-2\pi mk_3}{M}} \end{bmatrix},$$

where M is the cardinality, and $\{k_1, k_2, k_3\}$ are constant integers to be optimized. To achieve 2 bits per second per polarization, the cardinality shall be M=256, which is significantly reduced from the Grassmann constellations and the computational complexity is reduced as well. For that case, optimal integers are $\{k_1, k_2, k_3\}=\{104, 14, 0\}$ to maximize the Euclidean distance. Since the fiber-optic channel is non-selective, the Euclidean distance is more important than the product distance. Note that every codeword $U_m$ is unitary, i.e., $U_m U_m^H = U_m^H U_m = I_2$.

At the transmitter which employs unitary differential encoding, the digital data buffer 320 generates the codeword index m (m<M) from 4q bits per 2 symbols. The unitary modulator 330 selects the m-th codeword $U_m$ from the code set 310. The x-/y-polarization signals are obtained by block-wise differential encoding 340, wherein the transmitting DP signal block [S(2k), S(2k+1)] is differentially encoded 340 by a matrix multiplication 341 of the delayed version 342 and the codeword $U_m$. The resulting x-polarization signal is therefore orthogonal to the y-polarization signal. It means that multiple unitary blocks become some sort of Grassmann constellations. Hence, differentially encoded unitary constellations are decoded by the GLRT process as well as differential decoding.

The Grassmann constellations and the unitary constellations are applicable to both wireless channels and optical channels. However, the fiber-optic channels have a unique characteristic distinguished from wireless communication channels, specifically, the optical channel H(k) is close to unitary since the polarization dependent loss (PDL) is low in practical fiber-optic systems. The embodiments of the invention provide an additional method to exploit the near-unitary property of the optical channels for performance improvement.

FIG. 4 shows a block diagram of the encoding and the decoding for a multi-dimensional crosstalk-free modulation, termed double-differential rotation codes which take advantage of the unitary property of the fiber-optic channels. At the transmitter 410, a 2-dimensional modulation signal P(k) 421 is first differentially encoded in an element-wise manner 420, i.e., x-/y-polarization signals are independently encoded in a conventional way. The differentially encoded vector V(k) 425 is then differentially encoded in a vector-wise manner 430 to obtain the transmitting DP signals S(k) 435. For the element-wise differential encoding 420, the signal P(k) is multiplied using an element-wise multiplier 423 by a vector V(k) with a delay 422 to obtain differential encoded signal V(k) 425. For the vector-wise differential encoding 430, the signal V(k) is multiplied 431 with a rotation matrix $Q_s$ 432, which is generated at a rotator 433 feeding a delayed version 434 of the transmitting DP signals S(k). The rotation matrix is given as follows:

$$Q_S = \frac{1}{\|S(k-1)\|} \begin{bmatrix} S_x(k-1) & -S_y^*(k-1) \\ S_y(k-1) & S_x^*(k-1) \end{bmatrix}$$

which becomes a unitary matrix for any non-zero signals S(k), namely, $Q_s Q_s^H = Q_s^H Q_s = I_2$. Note that the crosstalk optical channel H(k) is also the same kind of such unitary rotation matrices except for a scalar term of A $e^{jB}$.

The double-differential rotation codes allow the receiver to decode the data in a differential manner even in the presence of a strong polarization crosstalk, whereas the conventional differential modulation per polarization does not accept crosstalk. At the receiver side 460, the received DP signal R(k) is differentially decoded in a vector-wise fashion 470 to obtain an intermediate data V'(k) 476, and it is further differentially decoded in an element-wise manner 480 to obtain an estimate of the desired data P'(k) 481.

For the vector-wise differential decoding 470, the received signal R(k) is multiplied with a rotation matrix $Q_R$ 473, which is generated by a rotator 474 given the delayed version 475 of the received signal as follows: The rotation matrix is given as follows:

$$Q_R = \frac{1}{\|R(k-1)\|} \begin{bmatrix} R_x(k-1) & -R_y^*(k-1) \\ R_y(k-1) & R_x^*(k-1) \end{bmatrix}.$$

Since the rotation matrix is unitary, there is no noise enhancement during the vector-wise differential decoding 470. The differentially decoded data V'(k) is expressed as $$V'(k) = Q_R^H R(k)$$
$$= Q_R^H H(k) Q_S V(k) + Q_R^H N(k)$$
$$= \begin{bmatrix} A_1 & 0 \\ 0 & A_2 \end{bmatrix} V(k) + N'(k),$$

where $\{A_1, A_2\}$ are scalar values dependent on A $e^{jB}$, and N'(k) is a residual noise. The above equation implies that any polarization crosstalk is automatically resolved by the differential rotation because the channel H(k) is close to a scaled unitary matrix.

To deal with the unknown scalar values $\{A_1, A_2\}$, the element-wise differential decoding 480 is performed for the intermediate data V'(k) 476 with an element-wise division 482 of the own delayed version 483 to obtain the final decoded data P'(k) 481. The rotation codes generally outperform the Grassmann constellations and the unitary constellations because the rotation codes exploit additional knowledge of the optical channel property.

The multi-dimensional crosstalk-free constellations are further enhanced by introducing additional error correction codes, such as low-density parity check codes and multi-dimensional trellis-coded modulations to achieve coding gains.

EFFECT OF THE INVENTION

The multi-dimensional crosstalk-free constellations according to embodiments of the invention have more than 3 dB improvement compared to the prior art DP constellations, at a high SNR and over a long fiber distance. In addition to the XPolM impairments, the method of the invention can deal with other nonlinear impairments of SPM and XPM as well as linear impairment of PMD, whereas the prior art schemes cannot do so.

The method of the invention increases the reach of the fiber distance by improving signal quality. Hence, the invention makes a considerable impact for the future long-haul optical communications which achieves beyond 100 Gbps data rate with DWDM and POLMUX. In telecommunication, the term "long-haul" pertains to switched circuits that span large distances, such as inter-state, and international communications.

The method offers a low-complexity receiver process which does not require polarization crosstalk cancellers and channel estimations.

The method achieves high quality factor because of the increased dimension of the constellations. Additional gains are available when multi-dimensional trellis-coded modulations and error correction codes are used in conjunction with the method of the invention.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing nonlinear cross-polarization modulation (XPolM) in a coherent optical communication system, comprising the steps of:
   double-differential rotation encoding in a transmitter, which comprises the steps of:
      differential encoding x-polarization and y-polarization signals $P(k)$ independently to obtain an intermediate signal $V(k)$;
      differential rotation encoding the intermediate signals $V(k)$ concurrently with a rotation matrix $Q_s$, wherein the rotation matrix $Q_s$ is generated by previously transmitted x-/y-polarization signals $S(k)$; and
      up-converting the electrical signals $S(k)$ to optical signals; and
   double-differential rotation decoding in a receiver, which comprises the steps of:
      down-converting the optical signal to an electrical signal $R(k)$ with a band-limiting filter;
      differential rotation decoding x-polarization and y-polarization signals jointly by multiplying a unitary rotation matrix $Q_R$, wherein the unitary rotation matrix $Q_R$ is generated a the previously received signals $R_k$ to obtain an intermediate estimate data $V'(k)$; and
      differential decoding the intermediate estimate data $V'(k)$ independently to obtain an estimate of a desired data $P'(k)$.

2. The method of claim 1, wherein polarization crosstalk caused by the XPolM and polarization mode dispersion (PMD) is resolved by an orthogonal multi-dimensional constellations based on rotation codes, unitary constellations, or Grassmann constellations.

3. The method of claim 2, further comprising the steps of:
   designing a unitary constellation code set U;
   buffering $4_q$ bits per two symbols to generate a code index m;
   selecting the m-th unitary constellation $U_m$;
   differentially encoding an x-/y-polarization signal block $[S(2k), S(2k+1)]$ by multiplying with the m-th unitary constellation $U_m$; and
   transmitting the differential unitary constellation.

4. The method of claim 2, further comprising the steps of:
   buffering $2_qL$ bits per L symbols to generate a code index m;
   generating a m-th alphabet $D_m$ of a non-orthogonal multi-dimensional modulation of a dimension $2\times(L-2)$;
   exponential mapping the alphabet $D_m$ into a higher-dimensional hyper-sphere surface on a Grassmannian manifold to obtain an orthogonal codeword $G_m$; and
   transmitting sequentially x-/y-polarization signals $S(k)$ from the orthogonal codeword $G_m$.

5. The method of claim 1, wherein the x-polarization signal and y-polarization signal are orthogonal at the transmitter, which generates dual-polarized multi-dimensional constellations including lattice modulations.

6. The method of claim 1, wherein additional coding gains are achievable by inner error correction codes, and multi-dimensional trellis-coded modulations (TCM) in conjunction with multi-dimensional crosstalk-free constellations.

7. The method of claim 1, wherein a number of polarization-multiplexed (POLMUX) signals over different wavelengths are multiplexed by wavelength-division multiplexing (WDM).

8. The method of claim 1, wherein the optical fiber includes multiple spans of single-mode fibers (SMF), optical amplifiers (OA), and dispersion-compensation fibers (DCF) for long-haul communications.

9. The method of claim 2, wherein a modified generalized-likelihood rate-test (GLRT) process with unitary-constraint, higher-order, and multi-symbol decoding is applicable to improve performance.

* * * * *